United States Patent
Becvar et al.

(10) Patent No.: US 8,368,381 B1
(45) Date of Patent: Feb. 5, 2013

(54) METHOD FOR MEASURING THE MOVEMENT OF AN OPTICAL POINTING DEVICE ON A WORK SURFACE

(75) Inventors: Milos Becvar, Colorado Springs, CO (US); Nicolas Chauvin, Chexbres (CH); Larry Bieber, Colorado Springs, CO (US); Kevin Buescher, Colorado Springs, CO (US)

(73) Assignee: EM Microelectronic-Marin, Marin (CH)

( * ) Notice: Subject to any disclaimer, the term of this patent is extended or adjusted under 35 U.S.C. 154(b) by 0 days.

(21) Appl. No.: 13/451,282

(22) Filed: Apr. 19, 2012

Related U.S. Application Data

(63) Continuation-in-part of application No. 13/372,996, filed on Feb. 14, 2012.

(51) Int. Cl.
  *G01R 19/00* (2006.01)
  *G09G 5/00* (2006.01)
  *G09G 5/10* (2006.01)
(52) U.S. Cl. ............... 324/76.11; 345/207; 345/690
(58) Field of Classification Search ......... 324/76.11, 324/606, 97, 96; 315/149, 150, 155, 156, 315/158; 345/207, 102, 39, 41, 44, 46, 48, 345/82, 84
See application file for complete search history.

(56) References Cited

U.S. PATENT DOCUMENTS

| | | | |
|---|---|---|---|
| 7,122,781 B2* | 10/2006 | Rotzoll et al. | 250/221 |
| 7,839,381 B2 | 11/2010 | Zhou et al. | |
| 7,839,387 B2* | 11/2010 | Afriat et al. | 345/166 |
| 7,876,307 B2 | 1/2011 | Bieber et al. | |
| 8,013,841 B2* | 9/2011 | Bieber et al. | 345/166 |
| 2003/0102425 A1* | 6/2003 | Rotzoll et al. | 250/221 |
| 2007/0171204 A1* | 7/2007 | Afriat et al. | 345/166 |
| 2007/0290121 A1* | 12/2007 | Bieber et al. | 250/221 |
| 2010/0220179 A1* | 9/2010 | Wang | 348/68 |
| 2011/0141077 A1* | 6/2011 | Cho et al. | 345/207 |

* cited by examiner

*Primary Examiner* — Hoai-An D Nguyen
(74) *Attorney, Agent, or Firm* — Oblon, Spivak, McClelland, Maier & Neustadt, L.L.P.

(57) ABSTRACT

It is described a method for measuring the movement of an optical pointing device on a work surface, which includes a pixel photo-detector array to pick-up reflected light on the work surface, a window comparator array receiving pixel voltages and providing comparison signals to a processing circuit. Light intensity between neighboring pixels is compared to determine edge direction data, which includes a positive edge for a first pixel voltage smaller than a second pixel voltage by more than a half of a window voltage, a no-edge, with the difference between the pixel voltages smaller than the half of the window voltage, and a negative edge, for which the first pixel voltage is greater than the second pixel voltage by more than the half of the window voltage. Two edge direction data from two successive flash are compared to determine the relative motion of the pointing device on the work surface.

16 Claims, 6 Drawing Sheets ns a method for
METHOD FOR MEASURING THE MOVEMENT OF AN OPTICAL POINTING DEVICE ON A WORK SURFACE This application claims priority from U.S. patent application Ser. No. 13/372,996 filed on Feb. 14, 2012, the entire disclosure of which is incorporated herein by reference.

FIELD OF THE INVENTION

The present invention generally relates to a method for measuring the movement of an optical pointing device on a work surface, in particular for controlling the position of a cursor on a screen, such as the display of a personal computer, workstation or other computing devices having a graphic user interface. Said optical pointing device can be a computer mouse, trackball and other computer peripherals. For the measuring method, the optical pointing device comprises an optical sensing device including a photo-detector array for measuring the varying intensity pattern of a portion of a surface which is illuminated with radiation. Furthermore, said optical pointing device can extract information about the relative motion between the photo-detector array and the illuminated portion of each type of surface.

The present invention concerns also the window comparator array for implementing the method for measuring the movement of an optical pointing device on a work surface. Said input signals of the window comparator array are signals from the photo-detector array, which picks up light reflected on the work surface.

BACKGROUND OF THE INVENTION

Such an optical pointing device of the prior art is known for example in U.S. Pat. No. 7,122,781 B2, filed in the name of the same Assignee, which is incorporated herein by reference. U.S. Pat. No. 7,122,781 B2 discloses a method and a device for motion detection in an optical pointing device, such as an optical computer mouse. Said optical pointing device is shown on FIG. 1.

Said optical pointing device comprises a photo-detector array 120 including a plurality of pixels arranged in rows and columns according a first axis X and a second axis Y. Said photo-detector array 120 is coupled to a motion detection processing circuit 100 for processing the signals outputted by the photo-detector array 120. A comparator array 115 is interposed between the motion detection processing circuit 100 and the photo-detector array 120. This comparator array 115 includes several bi-state comparator circuits each for comparing a first integrated voltage from the light intensity of a first pixel of array with a second integrated voltage from the light intensity of a second pixel of array and for outputting a resulting edge direction condition.

It should be noted that a distinction is made between edges according to a direction on a first axis X and a direction on a second axis Y. The first axis X extends with a positive direction from left to right, and the second axis Y extends with a positive direction from bottom to top. In particular, two distinct edge direction conditions are defined, such as a first edge condition, or positive edge, and a second edge condition, or negative edge. The positive edge is defined as a condition wherein the first integrated voltage from the light intensity of a first pixel is smaller than the second integrated voltage from the light intensity of a second pixel. Said second pixel is placed on the right of the first pixel according to the axis X and placed on the upper side of the first pixel according to the axis Y. The negative edge is defined as a condition wherein the first integrated voltage from the light intensity of the first pixel is greater than the second integrated voltage from the light intensity of the second pixel. Both compared pixels can be adjacent or non-adjacent.

The optical pointing device further comprises at least one light source 110 such as a LED, which produces radiation that impinges on a portion of a work surface S. Said work surface S may be a planar or non-planar surface, such as a surface over which the optical pointing device is moved, the surface of a ball of an optical trackball, or any other suitable surface that may provide an appropriate intensity pattern for detection by the photo-detector array 120. For this optical pointing device, a light source is not, strictly speaking, necessary and that ambient light reflected by said work surface S may directly be used.

The motion detection processing circuit 100 is further adapted to communicate in a bi-directional manner with an interface 150 that communicates in turn with a host system (not illustrated) over a bus 155. Cursor control signals, and eventually other signals related to the optical pointing device, are supplied to the host system over bus 155. The motion detection processing circuit 100 may also receive information, such as configuration signals, over bus 155 from the host system.

The motion detection processing circuit 100 is essentially designed to intermittently sample the pixel outputs of photo-detector array 120 in accordance with a defined sequence. The edge information of two successive samples is compared and a relative motion measurement is extracted by the motion detection processing circuit 100. The adequate cursor control signals are then derived from the relative motion measurement and transmitted to the host system via line interface 150.

According to U.S. Pat. No. 7,122,781 B2, it is disclosed a so-called "Peak/Null Motion Detection" algorithm. Each row and column of the photo-detector array 120 is further analysed to find specific inflection conditions or data as shown on FIG. 2 of a schematic illustration of edge inflection conditions or data, or peaks and nulls, derived from a sequence of edge direction conditions along a determined axis. A first inflection condition, defined by a "peak", and a second inflection condition, defined by a "null" are determined in the direction of successive edges along a selected axis. This is performed in practice along X and Y axes. The first inflection condition, or peak, is defined as the succession, along a determined axis X or Y, of a positive edge followed by a negative edge. Similarly, the second inflection condition, or null, is defined as the succession, along the determined axis, of a negative edge followed by a positive edge.

In contrast to the above edge direction conditions, it will be appreciated that the edge inflection conditions do not appear everywhere. Strictly speaking, one should also consider that there exists a third inflection condition representative of the fact that there does not exist, at a selected location, any inflection in the direction of the edges. Furthermore it can depend on the contrast of the work surface, which can cause some problem of motion detection of such an optical pointing device.

As shown on FIG. 3, the basic principle for detecting motion is based on the above edge inflection data. FIG. 3 shows a particular situation for a single axis motion detection of a succession of ten successive edge direction conditions and extracted edge inflection conditions determined from two successive flashes from the light source. Said inflection conditions are derived from two successive light intensity patterns detected by the photo-detector array. This particular situation is typical of sub-pixel motion, which is the displacement of less than the pixel pitch between two successive flashes.

As shown in FIG. 3, three edge inflection conditions are detected, namely a peak between the second and third edge direction conditions, a null between the fourth and fifth edge direction conditions, and a peak between the seventh and eighth edge direction conditions. Following the second flash, one can see that only the null condition moved one unit to the right, which defines a sub-pixel motion. In addition to accumulators in the processing circuit 100 for tracking motion of edge inflection conditions, one additional accumulator per axis is provided for counting the total number of edge inflection conditions appearing on each axis, i.e. peaks and nulls together.

The accumulator associated to the tracking of motion of edge inflection conditions can be incremented. So the total number of peaks and nulls detected by accumulator associated for counting the total number of edge inflection conditions being in this case three. For motion detection along two axes, these steps are performed for each row of the array along axis X and each column of the array along axis Y, which is well known in this prior art.

A calculation method may consist in computing the motion values along axes X and Y directly, as summarized by the following analytical expressions:

$$X_{DISPLACEMENT} = \frac{(N_{PEAK-RIGHT} + N_{NULL-RIGHT}) - (N_{PEAK-LEFT} + N_{NULL-LEFT})}{(N_{XPEAK} + N_{XNULL})} \quad (1)$$

$$Y_{DISPLACEMENT} = \frac{(N_{PEAK-UP} + N_{NULL-UP}) - (N_{PEAK-DOWN} + N_{NULL-DOWN})}{(N_{YPEAK} + N_{YNULL})} \quad (2)$$

This method requires a minimum of two accumulators per axis, one for tracking motion of edge inflection conditions with peaks and nulls still tracked independently, and another one for tracking the total number of edge inflection conditions detected along the selected axis. However the motion detection of the optical pointing device for implementing this method can be dependent on the contrast of the work surface and can lead to some mistakes if there is a low contrast on the work surface, which is a drawback.

To improve the motion detection, it can be provided to equip an optical pointing devices with a laser illuminated source, which is already known in the prior art. With such laser illumination, an optical pointing device can work on a much wider variety of surfaces. However the coherent nature of the illumination results in a received image that contains generally high spatial frequencies especially compared to viewing the same surface with a non-coherent LED illumination. This high frequency content leads to spatial aliasing due to beyond under-sampled in the spatial domain. This aliasing leads to several bad effects, such as loss of resolution or apparent "reverse" motion. One alternative to deal with the higher spatial frequency content is to create smaller pixels with higher spatial capability in the imager. However two major problems arise with smaller pixels that are a lower mouse-speed/acceleration capability and a lower sensitivity to light, i.e. less collection area in the pixel.

The U.S. Pat. No. 7,876,307 B2, filed in the name of the same Assignee and which is incorporated in its entirety herein by reference, for instance discloses a method for measuring relative motion between an illuminated portion of a work surface and an optical pointing device. Said optical pointing device comprises a coherent light source and a photo-detector array. The measuring method comprises the steps of illuminating under a determined gradient by a coherent light source, the surface portion at a determined flash rate, of detecting by the photo-detector array, speckled light intensity pattern of the illuminated portion of the surface for a first flash, of detecting a second speckled light intensity pattern of the illuminated portion of the surface for a second flash, of extracting motion features of two different types from the detected first and second speckled light intensity patterns, of keeping only pairs of neighbouring motion features including one motion feature of both different types, and of determining a measurement of the relative motion between the optical sensing device and the illuminated surface portion based on a comparison of kept motion features.

Although such a solution as disclosed in the U.S. Pat. No. 7,876,307 B2 presents several advantages in dealing with a coherent light source in an optical pointing device, since laser illumination has a very large spectral content, there is still a need to further and better control the quantity of data needed to determine an accurate measurement of relative motion between the optical pointing device and the illuminated surface portion. However some problems can occur based on the type of work surface for the optical computer mouse, even if a coherent light source is used for illuminating a portion of the work surface, which is a drawback.

By summarizing in an existing measuring method of such an optical pointing device, which is based on comparing non adjacent or adjacent pixel values or voltages, the illuminated surface image is converted into an array of binary edges as above-mentioned. Said edge array is used for the detection of peaks and nulls in a motion detection processing circuit of the optical pointing device, in order to be used for statistical movement measurement. The peaks and nulls are defined as transitions between positive and negative edges for the peaks and between negative and positive edges for the nulls.

The prior art measuring method works well on surfaces with sufficient contrast on which pixel voltage differences are sufficient to produce reliable positive or negative edges. However on some other types of work surfaces, the difference between two pixel voltages can be relatively small and binary edge detection is less reliable in particular with a presence of electronic or optical noise. So the location of detected peaks and nulls is highly variable and uncorrelated to actual movement of the optical pointing device. Furthermore the illumination gradient on the pixel array introduces fixed pattern of edges, which limits statistical movement detection.

The U.S. Pat. No. 7,839,381 B2 describes a solution to improve the detection of an optical pointing device in presence of noise. For that an adapted hysteresis is provided for the comparison of the two integrated pixel voltages through each comparator of the comparator array. Said hysteresis can also be adapted in function of the state in which the optical pointing device is. However even if the comparison is performed with the adapted hysteresis, said optical pointing device is not able to well operate on each work surface, which is a drawback.

One solution of this abovementioned problem would be to improve contrast on a given work surface by optical system design. However, optical system design must consider variety of surfaces with different and sometimes contradictory requirements. Consequently correct handling of low contrast work surfaces by the pixel array has to be considered for supporting large set of surfaces for operating accurately the optical computer mouse on such a low contrast work surface.

The optical pointing device of the prior art cannot be efficiently used on a low contrast work surface.

SUMMARY OF THE INVENTION

It is thus a main object of the invention to provide a method for measuring the movement of an optical pointing device on each type of work surface, even a low contrast work surface, which overcomes the drawbacks of the prior art.

The invention therefore concerns a method for measuring the movement of an optical pointing device on a work surface, said optical pointing device comprising a light source controlled by a motion detection processing circuit in order to illuminate a portion of the work surface, a photo-detector array including a plurality of rows and columns of pixels respectively aligned along first and second axes to pick-up reflected light on the work surface, a window comparator array for receiving input pixel voltages from the photo-detector array and to provide comparison signals to the motion detection processing circuit for calculation of the movement of said optical pointing device on the work surface, said method comprising the steps of:
 a) detecting by means of said photo-detector array a first light intensity pattern of said illuminated portion of the work surface following a first flash from the light source,
 b) comparing light intensity between neighbouring pixels of said photo-detector array on the basis of input pixel voltages, provided to the window comparator array, and determining along each of said first and second axes, first edge direction data from said detected first light intensity pattern, which edge direction data is descriptive of light intensity differences between said neighbouring pixels, said edge direction data being defined as:
  a first edge condition, or positive edge, defined as a condition wherein a first input pixel voltage from the light intensity of a first pixel is smaller than the second input pixel voltage from the light intensity of a second pixel by more than a half of a defined window voltage of the window comparator array,
  a second edge condition, or no-edge, defined as a condition wherein the difference in absolute value between the first and second input pixel voltages is smaller than the half of the defined window voltage, and
  a third edge condition, or negative edge, defined as a condition wherein the first input pixel voltage is greater than the second input pixel voltage by more than the half of the defined window voltage,
 c) storing said first extracted edge direction data therefrom,
 d) detecting a second light intensity pattern of said illuminated portion of the work surface following a second flash from the light source,
 e) comparing light intensity between neighbouring pixels of said photo-detector array on the basis of input pixel voltages, and determining along each of said first and second axes, second edge direction data from said detected second light intensity pattern,
 f) determining a measurement of the relative motion between said optical pointing device and said illuminated portion of the work surface in part based on a comparison of said first and second edge direction data determined at steps b) and e).

Some particular steps of the method are defined in the dependent claims 2 to 12.

One advantage of the method for statistical measuring the movement of an optical pointing device on a work surface lies in the fact that there is a higher quality of operation of the optical pointing device on each type of work surface, even a low contrast work surface. For that it is performed a tri-state comparison in the window comparator array. A first and second light intensity patterns of said illuminated portion of the work surface are detected by the photo-detector array following a first flash and a successive second flash from the light source. A comparison of light intensity between neighbouring pixels of said photo-detector array on the basis of input pixel voltages, is performed in the window comparator array in order to provide first and second edge direction data to the processing circuit. A positive edge is defined as a condition wherein a first input pixel voltage is smaller than a second input pixel voltage by more than a half of a defined window voltage of the window comparator array. A no-edge is defined as a condition wherein the difference in absolute value between the first and second input pixel voltages is smaller than the half of the defined window voltage. A negative edge is defined as a condition wherein the first input pixel voltage is greater than the second input pixel voltage by more than the half of the defined window voltage. The movement of the optical pointing device is determined in part based on a comparison of said first and second edge direction data.

Another advantage of the method lies in the fact that first and second edge inflection data are extracted respectively from first and second edge direction data in the motion detection processing circuit. A strong peak, a weak peak, a strong null and a weak null are inflection conditions obtained thanks to the tri-state comparison of input pixel voltages. Locations of first and second inflection data are compared in the processing circuit, and a determination of the motion direction is performed. Finally an overall displacement measurement from the determined motion direction of the edge inflection data is performed.

Another object of the present invention concerns a window comparator array for an optical pointing device for implementing the method for measuring the movement of an optical pointing device on a work surface. The window comparator array includes several window comparator circuits. Each window comparator circuit includes a first capacitor to store a voltage of a first input signal, a second capacitor to store a ground voltage or an offset voltage, a third capacitor to store an offset voltage or a ground voltage, and a fourth capacitor to store a voltage of a second input signal, and a comparator to compare a first input pixel voltage adapted by a first factor, with a second input pixel voltage adapted by a second factor added to an offset voltage adapted by a third factor or to compare the first input voltage adapted by the first factor added to an offset voltage adapted by a fourth factor, with the second input voltage adapted by the second factor.

Some particular embodiments of the window comparator array are defined in the dependent claims 14 and 16.

BRIEF DESCRIPTION OF THE DRAWINGS

Other aspects, features and advantages of the present invention will be apparent upon reading the following detailed description of at least one non-limiting example and embodiment made with reference to the accompanying drawings, in which.

DETAILED DESCRIPTION OF THE INVENTION

The following description concerns specifically a method for measuring the statistical movement of an optical pointing device on each type of work surface, even a low contrast work surface. This concerns also a window comparator array with several window comparator circuits for an optical pointing device for performing each a tri-state comparison between two input pixel signals, which are preferably two input pixel voltages.

Figure 1:
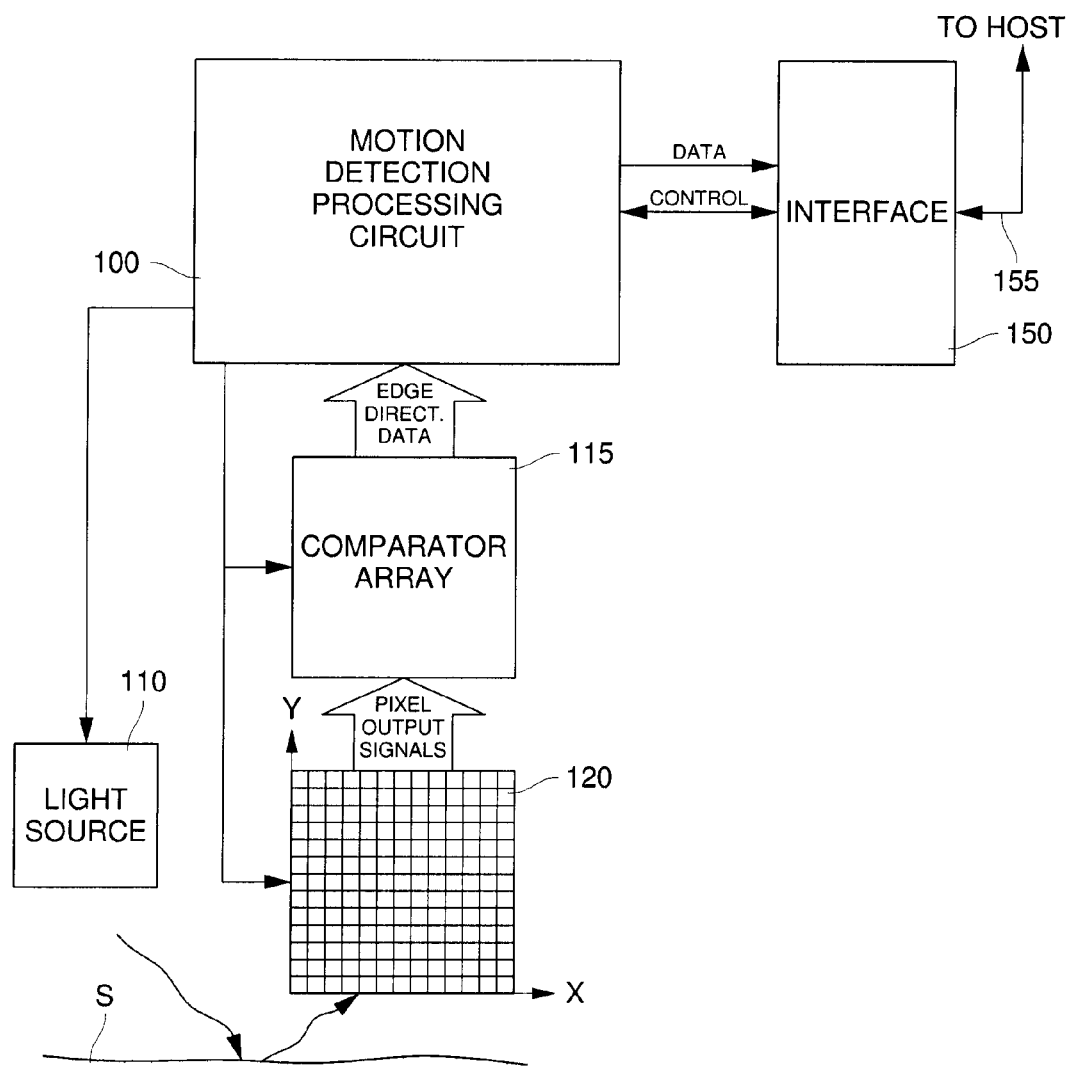
FIG. 1 is a schematic block diagram of an optical pointing device according to the prior art.
Figure 2:
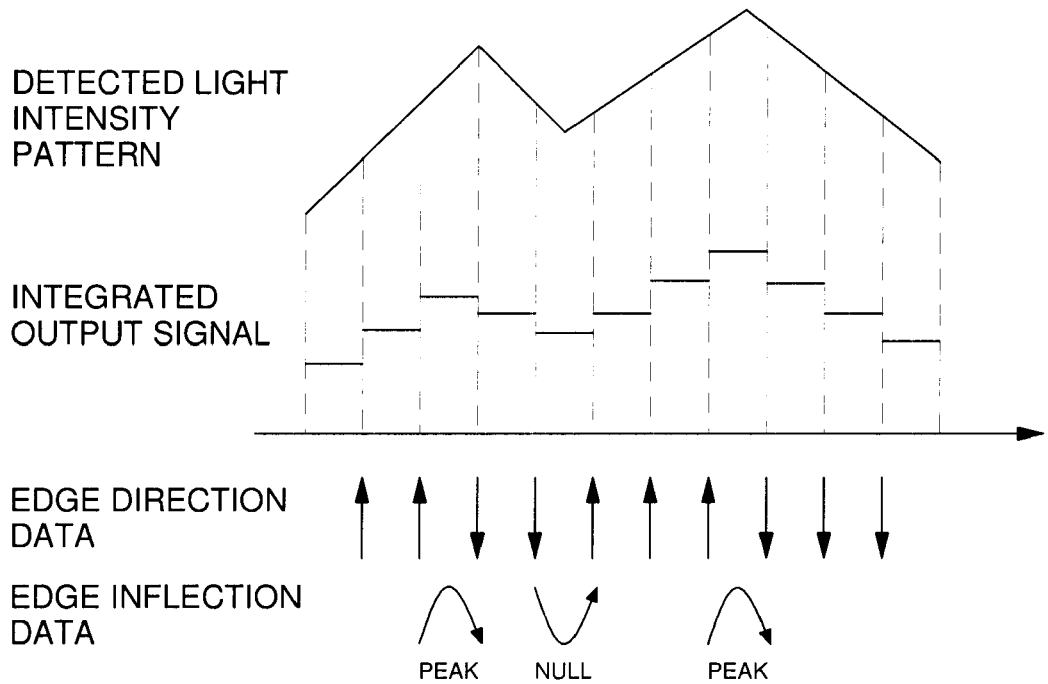
FIG. 2 is a schematic illustration of edge inflection conditions or data, or peaks and nulls, derived from a sequence of edge direction conditions or data along a determined axis according to the "Peak/Null motion detection" technique of the prior art.
Figure 3:
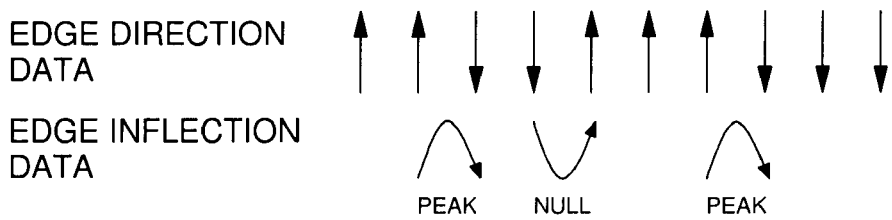
FIG. 3 is a schematic illustration of a motion detection technique which is based on the tracking of peaks and nulls along one axis according to the "Peak/Null motion detection" technique of the prior art.
Figure 3:
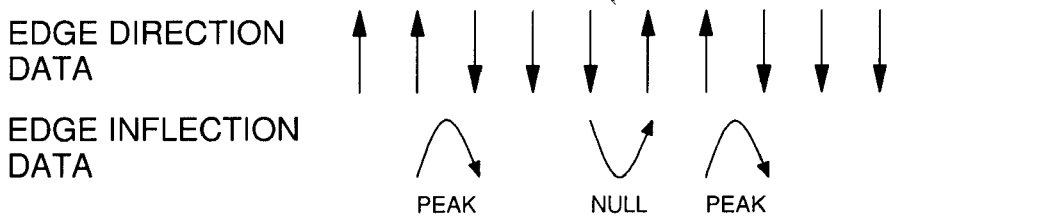

The optical pointing device of the present invention for implementing the method of measuring movement of said optical pointing device on a work surface, is made in a same configuration like the optical pointing device of the prior art shown on FIG. 1 above-described. The light source 110 for the optical pointing device can be preferably at least one coherent light source 110, such as a laser illumination source, or also a non-coherent light source, such as a LED source. Said light source can be controlled by the motion detection processing circuit 100 in order to produce radiation at a determined flash rate on a portion of a work surface S. The optical pointing device includes also a photo-detector array 120 having a plurality of pixels, to pick up the light reflected on said work surface S, which can be also a low contrast work surface S. This photo-detector array 120 is coupled to the motion detection processing circuit 100 for processing the signals outputted by the photo-detector array 120 in particular from two successive light intensity patterns.

A comparator array 115 is interposed between the photo-detector array 120 and the motion detection processing circuit 100. Said window comparator array is controlled in time by the motion detection processing circuit 100. Said comparator array 115 includes a plurality of window comparator circuits explained below in more details in reference to FIGS. 7 to 9. Each tri-state or window comparator circuit is provided for comparing the light intensity of a first pixel of array 120 with the light intensity of a second pixel of array 120 adjacent or non-adjacent of the first pixel. Each window comparator circuit is also provided for outputting comparison signals for one of the three states defined by the window comparator circuit, and also resulting motion feature conditions.

The coherent or non-coherent light source 110 of the optical pointing device, produces radiation at a determined flash rate, that impinges with a determined gradient on a portion of a work surface S. Said work surface S may be a planar or non-planar surface, such as a surface over which the pointing device, such as an optical computer mouse, is moved, the surface of a ball for an optical trackball or any other suitable surface that may provide an appropriate speckled intensity pattern for detection by photo-detector array 120. Said work surface can be also a low contrast work surface S.

The motion detection processing circuit 100 is further adapted to communicate data or control signals in a bi-directional manner with an interface 150 that communicates in turn with a host system over a bus 155. For example, cursor control signals are supplied to the host system over bus 155. Said motion detection processing circuit 100 may also receive information, such as configuration signals, over bus 155 from the host system.

Said motion detection processing circuit 100 is essentially designed to intermittently sample the pixel outputs of photo-detector array 120 in accordance with a defined sequence. The information of two successive samples or speckled images is compared and a relative motion measurement is extracted by the motion detection processing circuit 100. The adequate cursor control signals are then derived from the relative motion measurement in particular by determining the number of extracted inflection data as explained hereafter, and transmitted to the host system via line interface 150.

Figure 4:
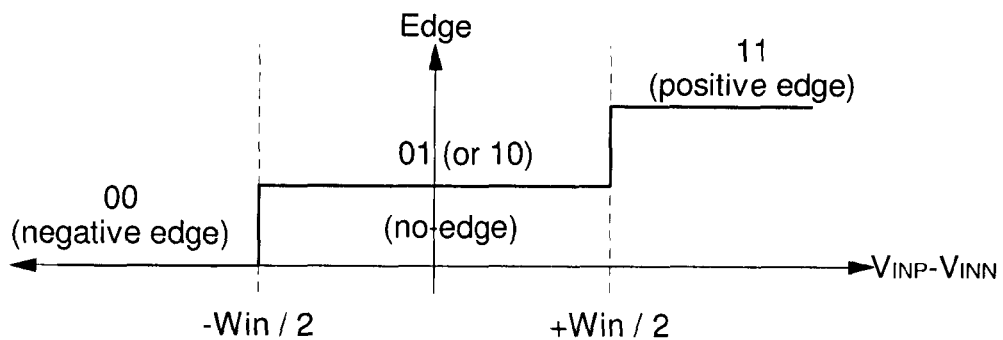
FIG. 4 shows a diagram of the different edge directions of a tri-state comparison between two input pixel voltages to be compared, used in the optical pointing device for implementing the method according to the present invention.

FIG. 4 shows a simplified diagram for defining edge directions of a tri-state comparison between two input pixel voltages $V_{INN}$ and $V_{INP}$ to be compared in the comparator array of the optical pointing device. Each input pixel voltage corresponds to an integrated voltage from light intensity picked up by a corresponding pixel of the photo-detector array. For the present invention, the definition of the edges to be considered, is extended in order to properly handle situation where the difference between pixel voltages is small. In the prior art, only two edge direction conditions or data are provided, which concern positive and negative edge direction conditions. For implementing the method for measuring movement of said optical pointing device on a work surface, it is considered another edge direction condition or data to define a window function by the tri-state comparator circuits of the comparator array.

Three states have to be considered for the window comparator circuit for the tri-state comparison of said two input pixels voltages $V_{INN}$ and $V_{INP}$. So one embodiment of a window comparator circuit can be controlled by the motion detection processing circuit, for performing a comparison between two input signals $V_{INN}$ and $V_{INP}$ in time in order to implement the window function. The window comparator circuit in combination of the motion detection processing circuit, is able to define three output levels at the output.

Said two input signals $V_{INN}$ and $V_{INP}$ have to be compared to determine if the first input signal $V_{INN}$ is smaller or greater than the second input signal $V_{INP}$ by more than Win/2 Volts, which is a half of a window voltage defined for the window comparator circuit. Said Win/2 Volts can be programmed and based on an offset voltage applied to said window comparator circuit. The first input signal $V_{INN}$ is obtained from the pixel at left from the pixel providing the second input signal $V_{INP}$ along the axis X or from the pixel lower than the pixel providing the second input signal $V_{INP}$ along the axis Y. The programmed window is defined as the inner region, where the first input pixel voltage $V_{INN}$ is within ±Win/2 Volts of the second pixel voltage $V_{INP}$. So the difference in absolute value between the first and second pixel voltages has to be smaller or equal than a half of the defined window voltage Win/2. This state in the inner region is called a "no-edge" direction condition since the direction of the edge cannot be properly defined. Small fluctuations of pixel differences within the window are handled without changing the edge state.

Figure 7:
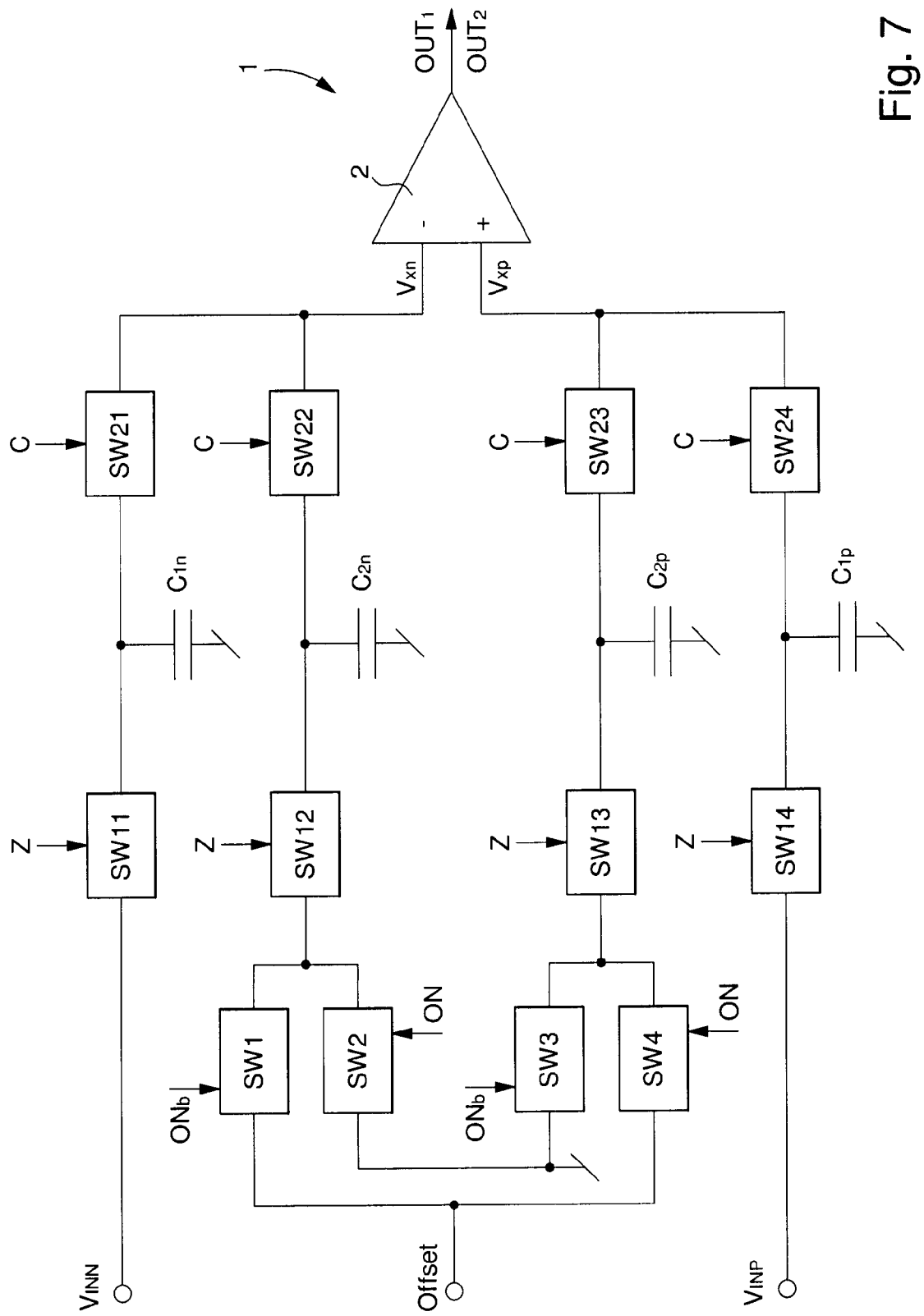
FIG. 7 shows an embodiment of a window comparator circuit of the comparator array for implementing the method for measuring the movement of an optical pointing device on a low contrast work surface of the present invention.
Figure 8:
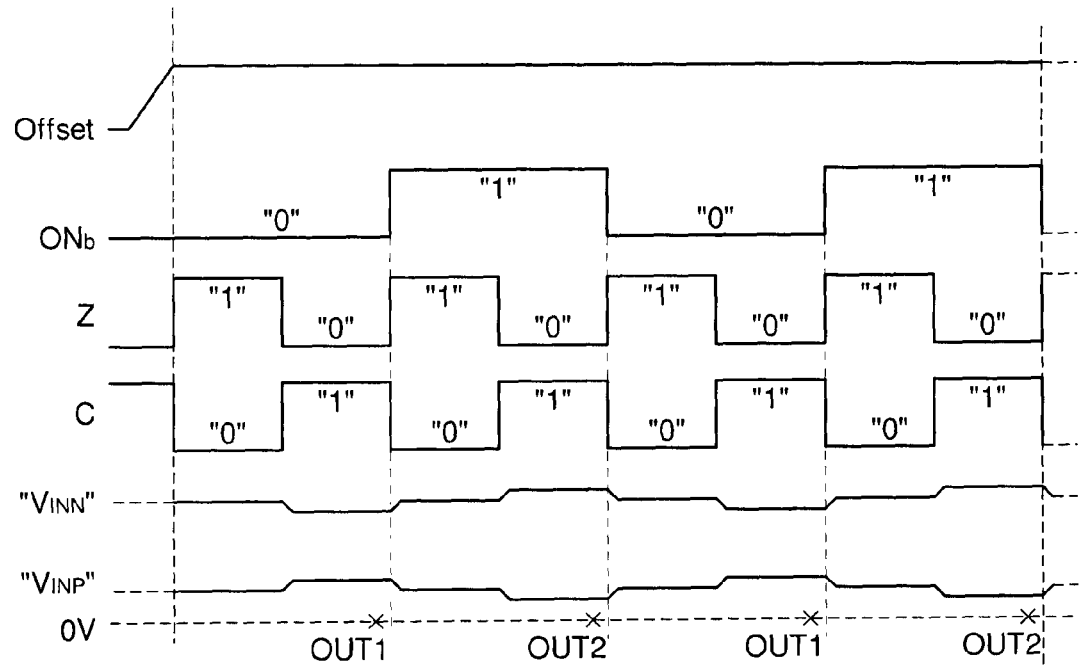
FIG. 8 shows a temporal diagram of signals through the window comparator circuit of FIG. 7, in which a first input pixel voltage is sufficiently greater than a second input pixel voltage.
Figure 9:
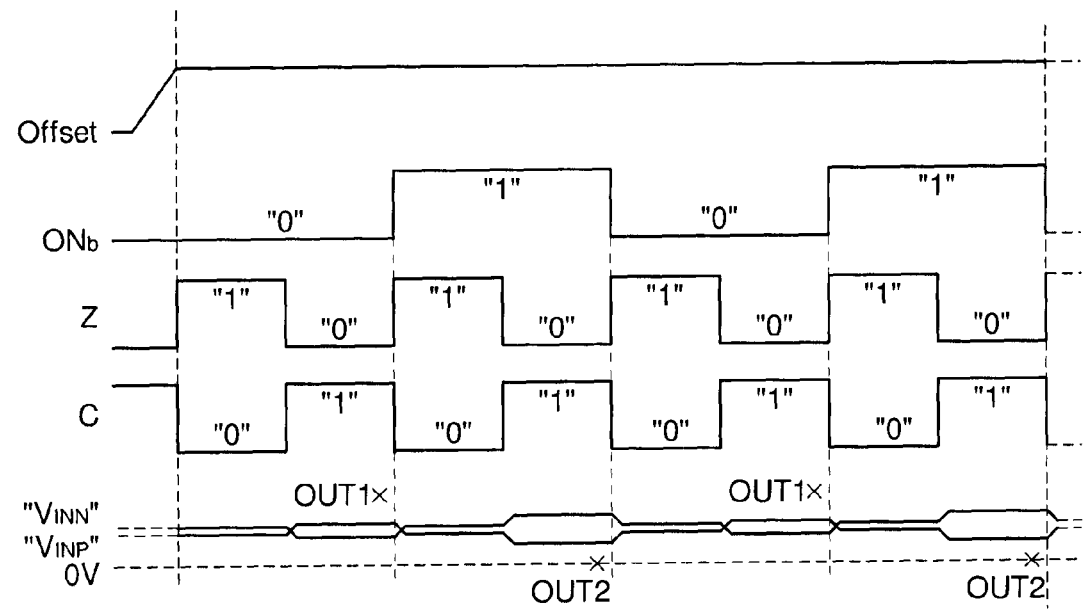
FIG. 9 shows a temporal diagram of signals through the window comparator circuit of FIG. 7, in which a first input pixel voltage is close to a second input pixel voltage.

For implementing the window function in the window comparator circuit, two comparison phases are provided as explained in more details hereafter in reference to FIGS. 7 to 9. An offset voltage multiplied by a determined factor is added to the second adapted input pixel voltage $V_{INP}$ in a first phase to be compared to the first adapted input pixel voltage $V_{INN}$ in order to define a first output signal $OUT_1$. In the second phase, the offset voltage multiplied by a determined factor is added to the first adapted input pixel voltage $V_{INN}$ to be compared to the second adapted input pixel voltage $V_{INP}$ in order to define a second output signal $OUT_2$. The result of the two successive output signals $OUT_1$ and $OUT_2$ allow defining the three output levels of the window comparator circuit.

For the method of measuring the statistical movement of the optical pointing device on the work surface, the effective use of the "no-edge" state is important to detect inflections, i.e. peaks and nulls, which are subsequently used for movement measurement. As already above-mentioned in the prior art, a peak is generally detected whenever positive edge (1) is followed by negative edge (0), whereas a null is detected whenever negative edge (0) is followed by positive edge (1). However a new definition of peak and null has to considered for the present invention as mentioned below. Owing to the use of the window function, the noise does not cause any great influence on the results of the tri-state comparison of several pairs of pixel voltages, given that the noise has to be well below the window width defined on the basis of the offset voltage.

Figure 5A:
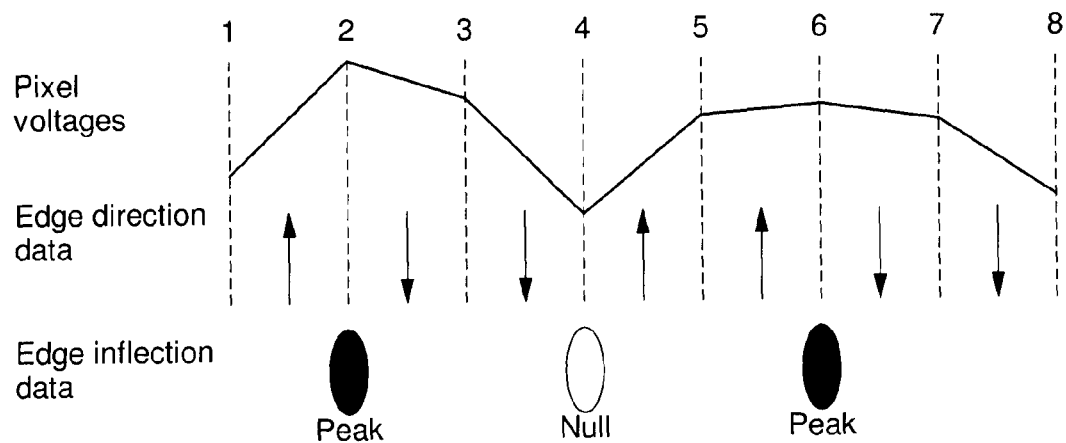
FIGS. 5a and 5b show a comparison along one axis between an edge inflection data illustration of the prior art and an edge inflection data illustration for measuring method of the movement of an optical pointing device on each type of work surface of the present invention.
Figure 5B:
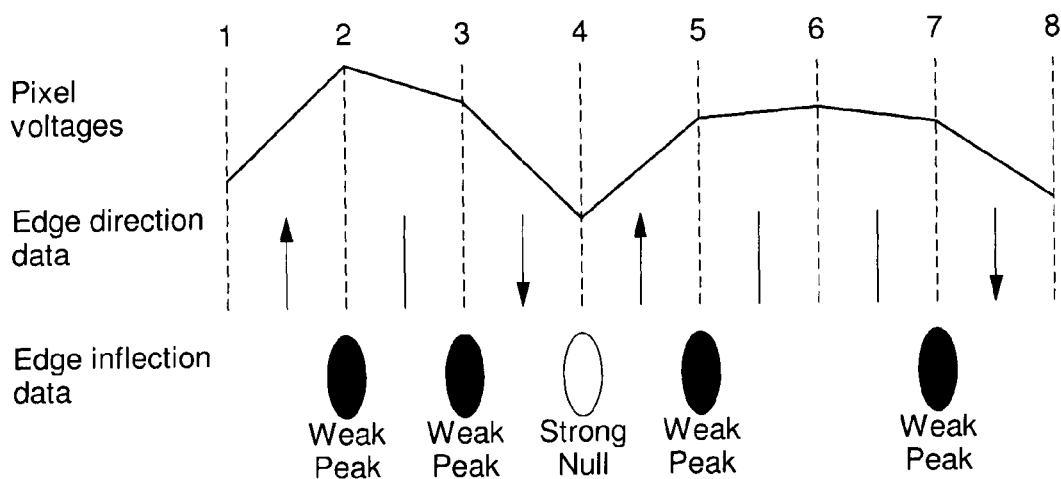

FIGS. 5a and 5b show a comparison along one axis between an edge inflection data illustration of the prior art and an edge inflection data illustration for measuring method of the movement of an optical pointing device on each type of work surface of the present invention.

On FIG. 5a, only two edge direction conditions are considered in a bi-state mode. We can see that peak and null detected on position 2 and 4 correspond to strong feature captured by change in pixel voltages. On the other hand, the peak detected on position 6 corresponds to weak feature of the image. Edges between the positions 5, 6 and 7 might toggle between consecutive images which would be seen as a movement of peak between position 5, 6 and 7. With the bi-state mode of the movement measuring method of the prior art optical pointing device, it is not possible to consider accurately small difference between two input pixel voltages to be compared in a conventional comparator circuit.

As shown on FIG. 5b, it is to be noted that a new definition of peaks and nulls is required and handled by the motion detection processing circuit. This new definition depends on the two comparison or output signals $OUT_1$ and $OUT_2$ provided successively by each window comparator circuit of the comparator array as explained in more details hereafter in reference to FIGS. 7 to 9. Along one or the other axis, a strong peak is detected whenever positive edge (11) is followed by negative edge (00). A weak peak is detected whenever positive edge (11) is followed by no-edge (01 or 10) or whenever no-edge (01 or 10) is followed by negative edge (00). A strong null is detected whenever negative edge (00) is followed by positive edge (11). A weak null is detected whenever negative edge (00) is followed by no-edge (01 or 10) or whenever no-edge (01 or 10) is followed by positive edge (11).

Figure 6:
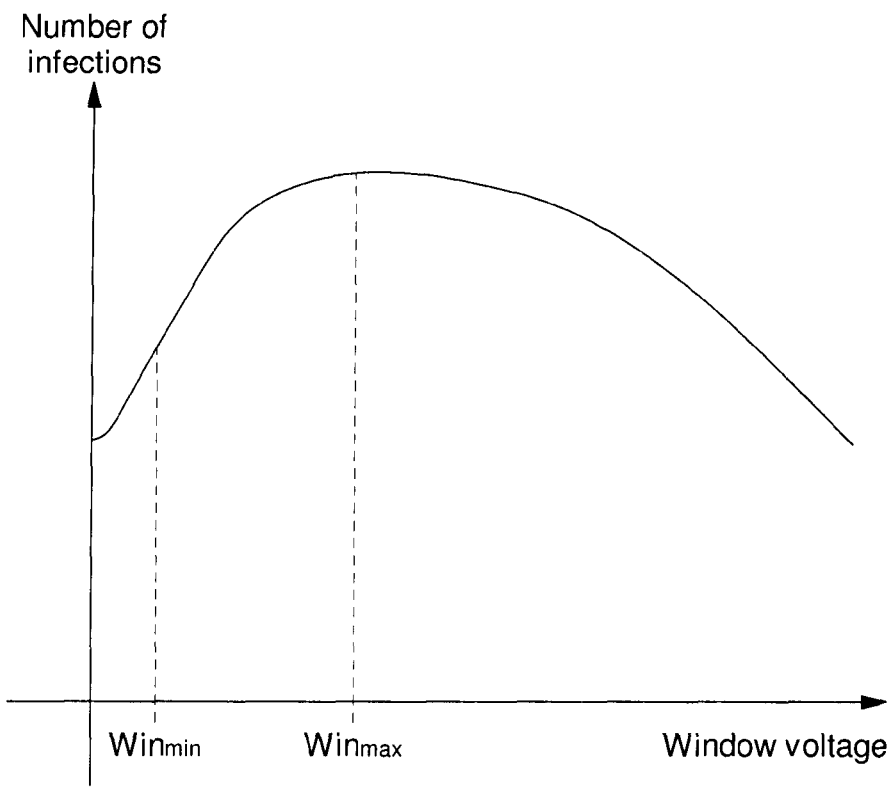
FIG. 6 shows a diagram of the number of inflections as a function of window voltage applied in each window comparator circuit of the tri-state comparator array of the present invention.

With this innovated tri-state edge direction and inflection definition, it can see on FIG. 5b that in general more inflections are detected in the motion detection processing circuit in said tri-state mode than said bi-state mode. Small changes in image gradient as shown in position 3 can be detected as weak peaks, or weak nulls. On the other hand, no inflections are detected on boundaries of uncertain or unstable no-edges as seen in position 6. Furthermore for a small comparator threshold voltage, i.e. a small offset voltage applied to each window comparator circuit, there are only strong inflections of peaks or nulls in the picked-up image. When the offset voltage is increased, the weak inflections start to pop-up in the picked-up image, which is due to the existence of no-edges. Said offset voltage is adapted and multiplied by two in order to define the window voltage Win for the window comparator circuit. At a certain point the number of weak inflections starts to drop again, when most of the edges are no-edges as shown on FIG. 6.

As the prior art motion detection processing circuit, first and second accumulators are used for tracking motion of edge inflection data depending on each axis. Furthermore, one additional accumulator per axis is provided for counting the total number of edge inflection data appearing on each axis, i.e. strong peaks, weak peaks, strong nulls and weak nulls together. This provides a loss-of-focus warning signal if said total number is smaller than a predetermined threshold.

It is to be noted that as the optical pointing device with the photo-detector array moves above the work surface, the image at each flash is distorted by illumination gradient and other factors. Some experiments have shown that weak inflection in one image can become strong inflection in the subsequent image. However, change of inflection type for example from peak to null, or from null to peak, is unlikely. Consequently the strength of inflection is ignored during subsequent statistical movement calculation. Statistical movement calculation is performed in the motion detection processing circuit as described in the above-mentioned prior art, which uses positions of peaks and nulls in subsequent images along the two axes X and Y. Statistical movement calculation can be performed as described in U.S. Pat. No. 7,122,781 B2, which is incorporated herein by reference, in particular based on the "Peak/Null Motion Detection" algorithm.

It is to noted that it can be also taken into account only the three states of edge direction conditions extracted in the motion detection processing circuit in order to determine the relative motion between the optical pointing device and the work surface. Said determination of the relative motion is obtained following two controlled flashes of the light source to illuminate a portion of the work surface and allow the photo-detector array to pick-up successively the reflected light on the portion of work surface.

In the present invention, a tri-state algorithm can introduce additional parameters for the motion photo-detector array of the optical pointing device, in particular concerning the window voltage range. Window voltage defines a range of pixel differences which are interpreted as no-edges. On FIG. 6, the dependency of inflection count on window voltage setting is shown. Exact parameters of this curve depend on the work surface, on which is moved the optical pointing device, the optical system characteristics and target integration voltage. Setting window voltage to zero is equivalent to the operation of the optical pointing device of the prior art in bi-state mode. However the operation close to zero window voltage is not optimal from the noise point of view. The undefined edges (10 or 01) correspond to wrong edge detection, which occurs at this region.

The minimal operating window voltage $Win_{min}$ is given by averaging noise level during edge direction detection. Increasing the window voltage leads to higher percentage of no-edges and consequently to greater number of inflections as shown in comparison on FIGS. 5a and 5b. However at some points, the number of inflections stops growing due to increased incidence of no-edge followed by no-edge. After the point designated $Win_{max}$, the number of inflections starts dropping as the window voltage is increased. At this point the number of positive and negative edges is reduced and inflection count drops. In the limiting case, all edges are becoming no-edges and there are zero inflections detected in the picked-up image. Practical range of operation of the photo-detector array is between points $Win_{min}$ and $Win_{max}$. The operation as close as possible to the limit $Win_{max}$ is effectively optimal, but since $Win_{max}$ is different for each surface, suitable compromise operating point must be found. Said window voltage has to be determined in order to allow the optical pointing device to detect efficiently the movement on a low contrast work surface as required by the present invention. The window voltage depends on the offset voltage multiplied by a particular factor, provided for each window comparator circuit of the window comparator array as explained hereafter in reference to FIGS. 7 to 9.

To measure the movement of the optical pointing device, locations between first and second extracted edge inflection data are compared. The direction of motion of said edge inflection data along said determined axis based on the result of the previous comparison is determined. Finally an overall displacement measurement from the determined direction of motion of said edge inflection data is computed in the motion detection processing circuit.

FIG. 7 shows a simplified view of a window comparator circuit 1 of a window comparator array for the optical pointing device, such as an optical computer mouse. With said window comparator circuit, it is possible to perform a tri-state comparison between two input pixel voltages $V_{INN}$ and $V_{INP}$, which are integrated pixel voltages. Several window comparator circuits 1 compose the window comparator array of said optical computer mouse, where each window comparator circuit 1 is controlled by the motion detection processing circuit in order to compare two input pixel voltages $V_{INN}$ and $V_{INP}$ providing from a photo-detector array.

A conventional signal comparator, which existed in previous computer mouse, can be used for the conception of one part of the window comparator circuit 1. However this window comparator circuit is controlled for performing a comparison between two input signals $V_{INN}$ and $V_{INP}$ in time in order to implement a window function. The window comparator circuit in combination of the motion detection processing circuit, is able to define three output levels at the output. Said two input signals $V_{INN}$ and $V_{INP}$ have to be compared to determine if the first input signal $V_{INN}$ is less or greater than the second input signal $V_{INP}$ by more than Win/2 Volts, which can be programmed.

So the window is defined as the inner region, where the first input signal $V_{INN}$ is within ±Win/2 Volts of the second input signal $V_{INP}$. To do that, the window voltage levels on the basis of an offset voltage are simply capacitively added to one signal or the other signal prior to comparing said two adapted input signals. An adapted offset voltage signal is proportionally added to the second adapted input signal $V_{INP}$ in a first phase and to the first adapted input signal $V_{INN}$ in a second successive phase. On the one hand, it can be compared for example the first adapted input signal, which is a first adapted input pixel voltage $V_{INN}$, added to an adapted offset voltage smaller than the second adapted input signal, which is a second adapted input pixel voltage $V_{INP}$. On the other hand, it can be compared for example the second adapted input pixel voltage $V_{INP}$ added to the adapted offset voltage smaller than the first adapted input pixel voltage $V_{INN}$. The adaptation of each signal depends on a capacitive ratio as explained hereafter.

Said window comparator circuit 1 includes a first series of switches SW1, SW2, SW3, SW4, a second series of switches SW11, SW12, SW13, SW14, a third series of switches SW21, SW22, SW23, SW24, four capacitors $C_{1n}$, $C_{2n}$, $C_{1p}$, $C_{2p}$ and a single comparator 2. Each switch can be made with a transistor MOS, and for example with a NMOS transistor with the gate control by a specific control signal in order to open said switch through the connection of source and drain terminals, with a high voltage as a regulated voltage supplied to the gate terminal, and to close said switch with a ground voltage supplied to the gate terminal. Said capacitors can be made also with some MOS transistors, for example with PMOS transistors. In this case, said PMOS transistors have each source and drain terminals, and the n-well terminal connected to a high potential terminal of a power supply source or to a regulated voltage, whereas a gate terminal is used as the negative terminal of each capacitor. So said PMOS transistors are mounted in an inversion mode to make said capacitors, which is preferable to an accumulation mode.

It is to be noted that said capacitors $C_{1n}$, $C_{2n}$, $C_{1p}$, $C_{2p}$ can be made also with NMOS transistors. In this case, each NMOS transistor has source and drain terminals, and the p-well or bulk terminal connected to a ground voltage, whereas a gate terminal is used as the positive terminal of the capacitor as shown on FIG. 7.

First and fourth switches SW1, SW4 of the first series of switches receive at the input an offset determined voltage Offset, whereas second and third switches SW2, SW3 receive at the input a ground voltage. The first and third switches SW1, SW3 of the first series of switches are controlled by a negative offset control signal ONb, whereas the second and fourth switches SW2, SW4 of the first series of switches are controlled by a positive offset control signal ON, which is the reverse of the negative offset control signal ONb.

When the negative offset control signal ONb is in a "0" state, the positive offset control signal ON is in a "1" state in a first phase of the method. So in this first phase of the method, the ground voltage passes through the second closed switch SW2 of the first series of switches, whereas the offset voltage Offset passes through the fourth closed switch SW4 of the first series of switches. In the first phase, the first switch SW1 and the third switch SW3 are in an open state. When the negative offset control signal ONb is in a "1" state, the positive offset control signal ON is in a "0" state in a second phase of the method. So in this second phase of the method, the offset voltage Offset passes through the first closed switch SW1 of the first series of switches, whereas the ground voltage passes through the third closed switch SW3 of the first series of switches. In the second phase, the second switch SW2 and the fourth switch SW4 are in an open state.

The four switches SW11, SW12, SW13, SW14 of the second series of switches are each controlled by a same first control signal Z. Said first control signal Z has a frequency two times greater than the frequency of each offset control signal ON, ONb. When the first control signal Z is in a "1" state, all the switches are in a closed state, whereas when said first control signal Z is in a "0" state, all the switches are in an open state.

Said second series of switches includes a first switch SW11 to receive at the input the first input signal $V_{INN}$, which is preferably a first input pixelvoltage $V_{INN}$ providing for example from one selected pixel of the pixel or photo-detector array. When the first control signal Z is in the "1" state, said first input pixel voltage $V_{INN}$ is stored or charged on a first capacitor $G_{1n}$. A second switch SW12 of the second series of switches receives at the input in the first phase, the ground voltage, and in the second phase, the offset voltage Offset. When the first control signal Z is in the "1" state, the ground voltage in the first phase or the offset voltage Offset in the second phase is stored or charged on a second capacitor $C_{2n}$. A third switch SW13 of the second series of switches receives at the input in the first phase, the offset voltage Offset, and in the second phase, the ground voltage. When the first control signal Z is in the "1" state, the offset voltage Offset in the first phase or the ground voltage in the second phase is stored or charged on a third capacitor $C_{2p}$. A fourth switch SW14 of the second series of switches receives at the input the second input pixel voltage $V_{INP}$ providing for example from another selected pixel of the pixel or photo-detector array. When the first control signal Z is in the "1" state, said second input pixel voltage $V_{INP}$ is stored or charged on a fourth capacitor $C_{1p}$.

The four switches SW21, SW22, SW23, SW24 of the third series of switches are each controlled by a same second control signal C. Said second control signal C has the same frequency like the first control signal Z, but the second control signal C is the reverse of the second control signal Z. When the second control signal C is in a "1" state, all the switches are in a closed state, whereas when said second control signal C is in a "0" state, all the switches are in an open state. The first switch SW21 of the third series of switches is connected between the first capacitor $C_{1n}$ and a negative input of a comparator 2. The second switch SW22 of the third series of switches is connected between the second capacitor $C_{2n}$ and the negative input of the comparator 2. The third switch SW23 of the third series of switches is connected between the third capacitor $C_{2p}$ and the positive input of the comparator 2. Finally the fourth switch SW23 of the third series of switches is connected between the fourth capacitor $C_{1p}$ and the positive input of the comparator 2.

When the second control signal C is in a "1" state, the first signal control Z is in a "0" state, and when the second control signal C is in a "0" state, the first signal control Z is in a "1" state. In principle the change of state of the second control signal C occurs with a slight delay after the change of state of the first control signal Z in order to perform a well defined comparison in the comparator 2. With the second control signal C in a "1" state, the first capacitor $C_{1n}$ and the second capacitor $C_{2n}$ are connected in parallel to the negative input of the comparator 2, and the third capacitor $C_{2p}$ and the fourth capacitor $C_{1p}$ are connected in parallel to the positive input of the comparator 2. In the first phase of the method, the first adapted voltage $V_{xn}$ at the negative input of the comparator 2 corresponds to the first input pixel voltage, which is capacitively adapted by the factor N/(N+M). So in the first phase of the method, the first adapted voltage is defined by $V_{xn}=V_{INN}\cdot(C_{1n}/(C_{1n}+C_{2n}))$, where N corresponds to the capacitive value $C_{1n}$ and M corresponds to the capacitive value $C_{2n}$. In the first phase, the second adapted voltage $V_{xp}$ corresponds to the second input pixel voltage, which is capacitively adapted by the factor N'/(N'+M'), added to the offset voltage, which is capacitively adapted by the factor M'/(N'+M'). So in the first phase of the method, the second adapted voltage is defined by $V_{xp}=V_{INP}\cdot(C_{1p}/(C_{1p}+C_{2p}))+\text{Offset}\cdot(C_2/(C_{1p}+C_{2p}))$, where N' corresponds to the capacitive value $C_{1p}$, whereas M' corresponds to the capacitive value $C_{2p}$.

In the second phase of the method, the first adapted voltage $V_{xn}$ at the negative input of the comparator 2 corresponds to the first input pixel voltage $V_{INN}$, which is capacitively adapted by the factor N/(N+M), added to the offset voltage, which is capacitively adapted by the factor M/(N+M). The second adapted voltage at the positive input of the comparator 2 corresponds to the second input pixel voltage $V_{INP}$, which is capacitively adapted by the factor N'/(N'+M'). Said first adapted voltage is defined by $V_{xn}=V_{INN}\cdot(C_{1n}/(C_{1n}+C_{2n}))+\text{Offset}\cdot(C_{2n}/(C_{1n}+C_{2n}))$, whereas the second adapted voltage is defined by $V_{xp}=V_{INP}\cdot(C_{1p}/(C_{1p}+C_{2p}))$.

Preferably to have symmetry on the two paths of comparison, the capacitive value of the first capacitor $C_{1n}$ corresponds to the capacitive value of the fourth capacitor $C_{1p}$, whereas the capacitive value of the second capacitor $C_{2n}$ corresponds to the capacitive value of the third capacitor $C_{2p}$. So the capacitive factor N/(N+M) corresponds to the capacitive factor N'/(N'+M'), and the capacitive factor M/(N+M) corresponds to the capacitive factor M'/(N'+M'). The second and third capacitors $C_{2n}$ and $C_{2p}$ can be each considered as a unit capacitor made for example with a PMOS transistor, which is connected in a preferred inversion mode or in an accumulation mode. The first and fourth capacitors $C_{1n}$ and $C_{1p}$ can be made each with 9 unit capacitors, to have a capacitive value corresponding to 9 times the capacitive value of the second or third capacitors $C_{2n}$ and $C_{2p}$. With these capacitive values, said capacitors can be easily matched in an integrated circuit. The four capacitors $C_{1n}$, $C_{2n}$, $C_{2p}$, $C_{1p}$ can be configured as 20 unit capacitors placed under a rectangular shape with seven unit capacitors for the length and three unit capacitors for the width.

With this capacitor arrangement and the second control signal C in "1" state, the offset voltage Offset is multiplied by the factor 1/10 to be added to the second or first input pixel voltage $V_{INP}$ or $V_{INN}$, which is multiplied by the factor 9/10, in the first or second phase of the method. With the addition of the adapted offset voltage for the first and second phases of the method, it is defined a tri-state comparison in the window comparator circuit 1.

In a first phase of the measuring method, a first output signal $OUT_1$ is provided at the output of the comparator 2, which is stored for example in memory in the motion detection processing circuit. In a second phase of the method, a second output signal $OUT_2$ is provided at the output of the comparator 2. If the first input pixel voltage $V_{INN}$ is greater than the second input pixel voltage $V_{INP}$ by more than Win/2 Volts, the output signals $OUT_1$ and $OUT_2$ are at a "0" state, i.e. at 0 V. If the second input pixel voltage $V_{INP}$ is greater than the first input pixel voltage $V_{INN}$ by more than Win/2 Volts, the output signals $OUT_1$ and $OUT_2$ are at a "1" state, i.e. at a high level near to a regulated voltage. If the first input pixel voltage $V_{INN}$ is within ±Win/2 Volts of the second input pixel voltage $V_{INP}$, the first output signal $OUT_1$ can be at 0 V or at high level, whereas the second output signal $OUT_2$ can be the reverse of the first output signal $OUT_1$, at high level or at 0 V. The Win/2 value can be for example 5 mV or more, but preferably selected in order to be between the half of $\text{Win}_{min}$ and $\text{Win}_{max}$ as shown on FIG. 6. So the motion detection processing circuit can easily consider the three levels of said window comparator circuit 1 in order to improve the detection of the motion of the computer mouse on each type of work surface.

To define the window function of said window comparator circuit 1, the Win/2 value corresponds to (M/N)·Offset supplied at the input of said window comparator circuit 1. Said offset voltage Offset can be programmed via a 4-bit bus from the motion detection processing circuit between 0 and 200 mV or preferably between 0 and 75 mV with an LSB value of 5 mV. In this case, with a maximum offset voltage at 75 mV, the first input pixel voltage $V_{INN}$ has to be greater or lower, than the second input pixel voltage $V_{INP}$ by more or smaller than approximately 8.5 mV to obtain the two output signals $OUT_1$ and $OUT_2$ at a low level or a high level. The voltage range of each input pixel voltage is between 0 and 500 mV and often close to 50 mV or 100 mV depending on the light reflected on a work surface and picked up by the pixels of the photo-detector array.

FIG. 8 schematically shows a temporal diagram of some signals through the window comparator circuit, in which a first input pixel voltage $V_{INN}$ is sufficiently greater than a second input pixel voltage $V_{INP}$ by more than (M/N)·Offset. In a first phase of the method, the negative offset control signal ONb is in a "0" state, whereas in a second phase of the method, the negative signal ONb is a "1" state. The positive offset control signal ON not shown is exactly the reverse of the negative offset control signal ONb. The duration for each state of said negative offset control signal ONb can be defined close to 2.5 µs for a frequency of said negative control signal ONb at 200 kHz.

The first control signal Z and the second control signal C, which is the reverse of the first control signal Z, have duration of each state corresponding to the half of the duration of the negative offset control signal, at 1.25 µs. If the frequency of the negative control signal ONb is at 200 kHz, the frequency of the first and second control signals Z and C is at 400 kHz. It can be envisaged to reduce said duration of each state for the first control signal Z and the second control signal C until a minimum of 500 ns.

In the case of the first input pixel voltage $V_{INN}$ greater than the second input pixel voltage $V_{INP}$ by more than (M/N)·Offset, the first output signal $OUT_1$ and the second output signal $OUT_2$ are each at 0 V. We can see on FIG. 8 for the first phase of the method and when the second control signal C in a "1" state that the first adapted voltage based on the first input pixel voltage $V_{INN}$ is slightly reduced, whereas the second adapted voltage based on the second input pixel voltage $V_{INP}$ is slightly increased, but lower than the first adapted signal. In the second phase, the first adapted voltage is slightly increased, whereas the second adapted voltage is slightly reduced. So the two output signals $OUT_1$ and $OUT_2$ are effectively at 0 V to define the first level of the window comparator circuit.

If the second input pixel voltage $V_{INP}$ is greater than the first input pixel voltage $V_{INN}$ by more than (M/N)·Offset, the two output signals $OUT_1$ and $OUT_2$ are in this case at a high level in the "1" state. So this defines the third level of the window comparator circuit, but not shown in FIGS. 8 and 9.

FIG. 9 schematically shows a temporal diagram of some signals through the window comparator circuit, in which a first input pixel voltage $V_{INN}$ is within ±(M/N)·Offset with respect to the second input pixel voltage $V_{INP}$. In this case, a second or intermediate level of the window comparator circuit is shown.

Specifically we can note that in the first phase of the measuring method, the second adapted voltage comes higher than the first adapted voltage when the second control signal C is in a "1" state. So the first output signal $OUT_1$ is at a high level in the "1" state in said first phase. However in the second phase of the method, the first adapted voltage is higher than the second adapted voltage when the second control signal C is in a "1" state. So the second output signal $OUT_2$ is at 0 V. The motion detection processing circuit can interpret the two different output signals $OUT_1$ and $OUT_2$ for considering the second or intermediate level of window comparator circuit.

On the basis of the description just given, numerous variants of the method for measuring the movement of an optical pointing device on a work surface, and said window comparator array in an optical pointing device for implementing the method can be designed by a person skilled in the art without departing from the scope of the invention as defined in the claims. Another window comparator circuit can be conceived with two comparators at output and to define the three states at output in a single measuring phase.

What is claimed is:

1. A method for measuring the movement of an optical pointing device on a work surface, said optical pointing device comprising a light source controlled by a motion detection processing circuit in order to illuminate a portion of the work surface, a photo-detector array including a plurality of rows and columns of pixels respectively aligned along first and second axes to pick-up reflected light on the work surface, a window comparator array for receiving input pixel voltages from the photo-detector array and to provide comparison signals to the motion detection processing circuit for calculation of the movement of said optical pointing device on the work surface, said method comprising the steps of:
   a) detecting by means of said photo-detector array a first light intensity pattern of said illuminated portion of the work surface following a first flash from the light source,
   b) comparing light intensity between neighbouring pixels of said photo-detector array on the basis of input pixel voltages, provided to the window comparator array, and determining along each of said first and second axes, first edge direction data from said detected first light intensity pattern, which edge direction data is descriptive of light intensity differences between said neighbouring pixels, said edge direction data being defined as:
      a first edge condition, or positive edge, defined as a condition wherein a first input pixel voltage from the light intensity of a first pixel is smaller than a second input pixel voltage from the light intensity of a second pixel by more than a half of a defined window voltage of the window comparator array,
      a second edge condition, or no-edge, defined as a condition wherein the difference in absolute value between the first and second input pixel voltages is smaller than the half of the defined window voltage, and
      a third edge condition, or negative edge, defined as a condition wherein the first input pixel voltage is greater than the second input pixel voltage by more than the half of the defined window voltage,
   c) storing said first extracted edge direction data therefrom,
   d) detecting a second light intensity pattern of said illuminated portion of the work surface following a second flash from the light source,
   e) comparing light intensity between neighbouring pixels of said photo-detector array on the basis of input pixel voltages, and determining along each of said first and second axes, second edge direction data from said detected second light intensity pattern,
   f) determining a measurement of the relative motion between said optical pointing device and said illuminated portion of the work surface in part based on a comparison of said first and second edge direction data determined at steps b) and e).

2. The method according to claim 1, wherein before or after the step c), the method includes the steps consisting in extracting first edge inflection data from said first edge direction data, and storing said first edge inflection data extracted from said first edge direction data, said first edge inflection data being descriptive of the succession of positive edges and no-edges and negative edges along each of said first and second axes of said photo-detector array, said edge inflection data being defined as:
- a first inflection condition, or strong peak, defined as the succession along one of said axes, of a positive edge followed by a negative edge,
- a second inflection condition, or weak peak, defined as the succession along one of said axes, of a positive edge followed by a no-edge, or a no-edge followed by a negative edge,
- a third inflection condition, or strong null, defined as the succession along one of said axes, of a negative edge followed by a positive edge, and
- a fourth inflection condition, or weak null, defined as the succession along one of said axes, of a negative edge followed by a no-edge, or a no-edge followed by a positive edge,
- wherein between the steps e) and f), the method includes the steps consisting in extracting second edge inflection data from said second edge direction data, and
- wherein the step f) of the method consists in:
  - f1) comparing locations of the second edge inflection data with previous locations of the first edge inflection data,
  - f2) determining the direction of motion of said edge inflection data along said determined axis based on the result of said comparison, and
  - f3) computing an overall displacement measurement from the determined direction of motion of said edge inflection data.

3. The method according to claim 2, wherein said step f) includes decrementing or incrementing at least one accumulator according to the direction of motion of said edge inflection data.

4. The method according to claim 3, wherein a first accumulator per axis tracks the total number of said edge inflection data, and wherein at least a second accumulator per axis tracks the direction of motion of said edge inflection data.

5. The method according to claim 2, wherein the direction of motion of edge inflection data is further determined along first and second diagonals of said first and second axes.

6. The method according to claim 2, further comprising the step of counting a total number of strong peaks, weak peaks, strong nulls and/or weak nulls and providing a loss-of-focus warning signal if said total number is smaller than a predetermined threshold.

7. The method according to claim 1, for which the window comparator array includes several window comparator circuits to compare each two input pixel voltages from neighbouring pixels of the photo-detector array along first and second axes, and to provide comparison signals, wherein in steps b) and e), the method includes in each window comparator circuit, steps consisting in a first phase:
- to store the voltage of a first input pixel voltage on a first capacitor, and a ground voltage on a second capacitor,
- to store an offset voltage on a third capacitor, and the voltage of a second input pixel voltage on a fourth capacitor,
- to compare in a comparator the first input pixel voltage, which is adapted by a first factor, with the second input pixel voltage, which is adapted by a second factor, added to the offset voltage, which is adapted by a third factor, to provide a first comparison signal, and
- wherein the method includes the steps consisting in a second phase:
  - to store the voltage of the first input pixel voltage on the first capacitor, and the offset voltage on the second capacitor,
  - to store the ground voltage on the third capacitor, and the voltage of the second input pixel voltage on the fourth capacitor;
  - to compare in the comparator the first input pixel voltage, which is adapted by the first factor, added to the offset voltage, which is adapted by a fourth factor, with the second input pixel voltage, which is adapted by the second factor, to provide a second comparison signal, and
  - to control the state of the first and second comparison signals to determine if the comparison of the first and second input pixel voltages is in a low state or in a high state if the first and second comparison signals have a same low or high output level, or in an intermediate state if the first and second comparison signals have a different output level, said high state defining a positive edge, said low state defining a negative edge, and said intermediate state defining a no-edge.

8. The method according to claim 7, wherein in the first phase of the method for the comparison in the comparator, the first input pixel voltage is adapted by the first factor defined by the ratio $N/(N+M)$, where N is the capacitive value of the first capacitor, and M is the capacitive value of the second capacitor, wherein in the first phase of the method for the comparison in the comparator, the second input pixel voltage is adapted by the second factor defined by the ratio $N'/(N'+M')$, where N' is the capacitive value of the fourth capacitor, and M' is the capacitive value of the third capacitor, and the offset voltage is adapted by the third factor defined by $M'/(N'+M')$, wherein in the second phase of the method for the comparison in the comparator, the first input pixel voltage is adapted by the first factor defined by the ratio $N/(N+M)$, and the offset voltage is adapted by the fourth factor defined by the ratio $M/(N+M)$, and wherein in the second phase of the method for the comparison in the comparator, the second input pixel voltage is adapted by the second factor defined by the ratio $N'/(N'+M')$.

9. The method according to claim 8, wherein in the first phase and the second phase of the method, the first factor for adapting the first input pixel voltage is equal to the second factor for adapting the second input pixel voltage, and the third factor for adapting the offset voltage is equal to the fourth factor for adapting the offset voltage.

10. The method according to claim 9, wherein in the first and second phases of the method, the first and second input voltages are adapted by the first and second factors, which are 9 times greater than the third and fourth factors for adapting the offset voltage.

11. The method according to claim 7, for which the window comparator circuit includes a first series of four switches, a first switch and a fourth switch receiving at the input the offset voltage, and a second switch and a third switch receiving at the input the ground voltage, the first and third switches being controlled by a negative offset control signal, whereas the second and fourth switches are controlled by a positive offset control signal, which is the reverse of the negative offset control signal, wherein in the first phase of the method, the second switch and the fourth switch are closed by the positive offset control signal in order to store the ground voltage on the second capacitor, and the offset voltage on the third capacitor, and wherein in the second phase of the method, the first switch and the third switch are closed by the negative offset control signal in order to store the offset voltage on the second capacitor, and the ground voltage on the third capacitor.

12. The method according to claim 11 for which the window comparator circuit includes a second series of four switches, which are each controlled by a first control signal, a first switch of the second series receiving at the input a first input pixel voltage, a second switch of the second series receiving the ground voltage in the first phase of the method and the offset voltage in the second phase of the method, a third switch of the second series receiving the offset voltage in the first phase of the method and the ground voltage in the second phase of the method, and a fourth switch of the second series receiving the second input pixel voltage, for which the window comparator circuit includes a third series of four switches, which are each controlled by a second control signal, which is the reverse of the first control signal, a first switch of the third series being connected between the first capacitor and a first input of the comparator, a second switch of the third series being connected between the second capacitor and the first input of the comparator, a third switch of the third series being connected between the third capacitor and the second input of the comparator, and a fourth switch of the third series being connected between the fourth capacitor and the second input of the comparator, wherein in the first phase of the method, the switches of the second series of switches are each closed first of all by the first control signal in order to store the first input pixel voltage on the first capacitor, the ground voltage on the second capacitor, the offset voltage on the third capacitor and the second input pixel voltage, on the fourth capacitor, wherein in the first phase of the method, the switches of the third series of switches are each closed by the second control signal, whereas all the switches of the second series of switches are open by the first control signal, in order to compare the first input voltage adapted by the first factor with the second input voltage adapted by the second factor added to the offset voltage adapted by the third factor, wherein in the second phase of the method, the switches of the second series of switches are each closed first of all by the first control signal in order to store the first input pixel voltage on the first capacitor, the offset voltage on the second capacitor, the ground voltage on the third capacitor and the second input pixel voltage, on the fourth capacitor, and wherein in the second phase of the method, the switches of the third series of switches are each closed by the second control signal, whereas all the switches of the second series of switches are open by the first control signal, in order to compare the first input pixel voltage adapted by the first factor added to the offset voltage adapted by the fourth factor, with the second input pixel voltage adapted by the second factor.

13. A window comparator array for an optical pointing device for implementing the method for measuring the movement of an optical pointing device on a work surface according to claim 1, wherein said window comparator array includes several window comparator circuits to compare each two input pixel voltages from neighbouring pixels of the photo-detector array along first and second axes, wherein each window comparator circuit includes a first capacitor to store a first input pixel voltage, a second capacitor to store a ground voltage or an offset voltage, a third capacitor to store an offset voltage or a ground voltage, and a fourth capacitor to store a second input pixel voltage, and a comparator to compare a first input pixel voltage adapted by a first factor, with a second input pixel voltage adapted by a second factor added to an offset voltage adapted by a third factor or to compare the first input pixel voltage adapted by the first factor added to an offset voltage adapted by a fourth factor, with the second input pixel voltage adapted by the second factor, and to provide two comparison signals.

14. The window comparator array according to claim 13, wherein each window comparator circuit includes a first series of four switches, a first switch and a fourth switch being intended to receive at the input the offset voltage, and a second switch and a third switch being intended to receive at the input the ground voltage, the first and third switches being controlled by a negative offset control signal, whereas the second and fourth switches are controlled by a positive offset control signal, which is the reverse of the negative offset control signal.

15. The window comparator array according to claim 14, wherein each window comparator circuit includes a second series of four switches, which are each controlled by a first control signal, a first switch of the second series being intended to receive at the input the first input pixel voltage, a second switch of the second series being intended to receive the ground voltage or the offset voltage, a third switch of the second series being intended to receive the offset voltage or the ground voltage, and a fourth switch of the second series being intended to receive the second input pixel voltage, and wherein the window comparator circuit includes a third series of four switches, which are each controlled by a second control signal, which is the reverse of the first control signal, a first switch of the third series being connected between the first capacitor and a first input of the comparator, a second switch of the third series being connected between the second capacitor and the first input of the comparator, a third switch of the third series being connected between the third capacitor and the second input of the comparator, and a fourth switch of the third series being connected between the fourth capacitor and the second input of the comparator.

16. The window comparator array according to claim 15, wherein the first and fourth capacitors of each window comparator circuit have a capacitive value greater than the capacitive value of the second and third capacitors.

* * * * *